United States Patent [19]

Berenbaum et al.

[11] 3,721,926

[45] March 20, 1973

[54] KEY-OPERATED TELEVISION CHANNEL SELECTOR

[75] Inventors: Arthur Berenbaum, Holland; Robert M. McDonough, Philadelphia, both of Pa.

[73] Assignee: Philco-Ford, Philadelphia, Pa.

[22] Filed: April 1, 1971

[21] Appl. No.: 130,336

[52] U.S. Cl. ....................334/7, 200/172 A, 334/39, 200/5 A, 325/352

[51] Int. Cl. ..........H03j 5/08, H04b 1/08, H01h 3/12

[58] Field of Search ............334/86, 87, 89, 7, 85, 39, 334/200, 325; 116/DIG. 29, DIG. 31; 200/172 R, 172 A, 5 A, 5 D, 5 E, 5 EA, 5 EP; 312/7 TV; 325/352, 353, 360, 46 J

[56] References Cited

UNITED STATES PATENTS

| | | | |
|---|---|---|---|
| 3,001,225 | 9/1961 | Squire | 16/166 |
| 3,505,602 | 4/1970 | Morrall et al. | 325/352 |
| 3,627,935 | 12/1971 | Spievak | 200/5 A |
| 1,103,657 | 7/1914 | Cano et al. | 200/5 A |
| 2,334,951 | 11/1943 | Parke et al | 16/166 X |

FOREIGN PATENTS OR APPLICATIONS

| | | | |
|---|---|---|---|
| 1,911,898 | 9/1970 | Germany | 334/7 |

*Primary Examiner*—Herman Karl Saalbach
*Assistant Examiner*—Wm. H. Punter
*Attorney*—Robert D. Sanborn

[57] ABSTRACT

Television receiving apparatus including a presettable tuner having a plurality of plunger-actuated, frequency-determining, elements with which the operator can select desired VHF and UHF stations. The actuating elements are normally concealed behind a control panel door, and the door is so constructed that portions thereof define a plurality of deflectable keys any one of which may be depressed to engage and operate an underlying tuning element. The door, including the keys, may be moved to open position to accommodate presetting of desired frequency channels.

2 Claims, 6 Drawing Figures

INVENTORS
ARTHUR BERENBAUM
ROBERT M. McDONOUGH
BY
AGENT

INVENTORS
ARTHUR BERENBAUM
ROBERT M. McDONOUGH
BY
Carl H. Symmestvedt
AGENT

KEY-OPERATED TELEVISION CHANNEL SELECTOR

BACKGROUND OF THE INVENTION

This invention relates to the tuning of broadcast receivers of the radio or television type. The principles of the invention are particularly, although not exclusively, useful in television receivers incorporating variable voltage capacitor (VVC) tuners.

In a typical VVC tuning system, a plurality of frequency-determining devices are used each of which has a plunger and a potentiometer associated therewith. This device produces a voltage used in tuning the receiver to any desired channel in the UHF or VHF band. The arrangement of the plunger arrays, and the indication of the channel to which each plunger will tune the receiver, has left much to be desired, from the standpoint of simplicity and convenience of operation.

SUMMARY OF THE INVENTION

This invention provides for placement of all of the plungers behind a door which covers the control panel area of the cabinet, and it is the general object of our invention to provide novel door structure which is movable to an open position affording ready access to the control means for presetting purposes, and which door structure includes a panel defining a plurality of key members carried by the door in such a way that each key member normally lies substantially in the plane of the door panel and is depressable to a position, out of said plane, in which it actuates its corresponding plunger and adjusts the tuner to one of the channels which have been preselected. In achievement of this general objective, we prefer to divide the main panel of the door into a frame portion and to slot remaining panel portions in a direction generally perpendicular to the panel frame portion, to provide a plurality of individual keys fixed at one side to the panel frame and free to be deflected with respect to the panel, preferably out of the plane of the latter. In such apparatus the door serves not only as a means to cover the controls, but also as a means for actuating the same.

DESCRIPTION OF THE ILLUSTRATED EMBODIMENT

Figure 1:
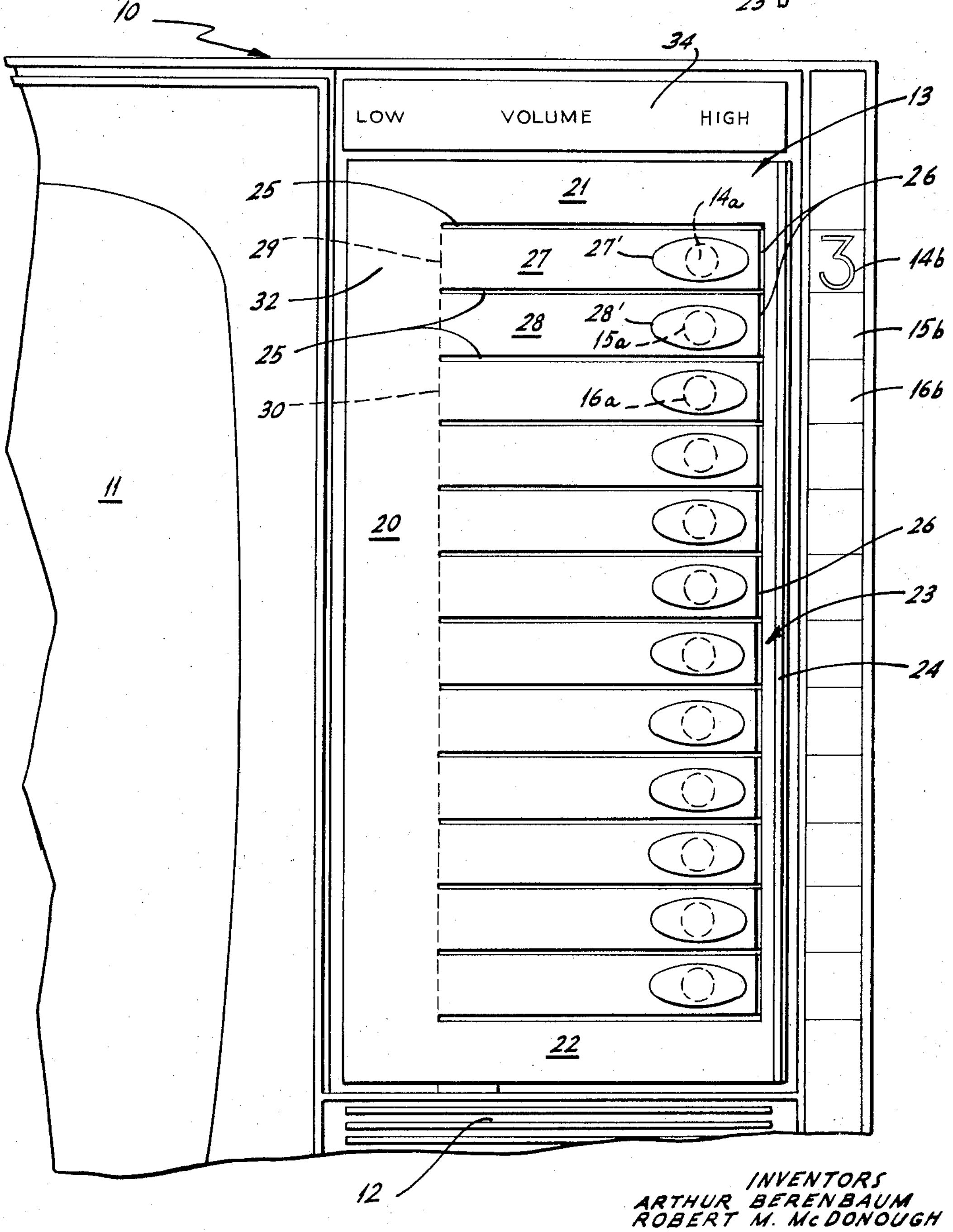
FIG. 1 is a fragmentary elevational view of a portion of a television receiver including door structure in accordance with the present invention.
Figures 3, 4:
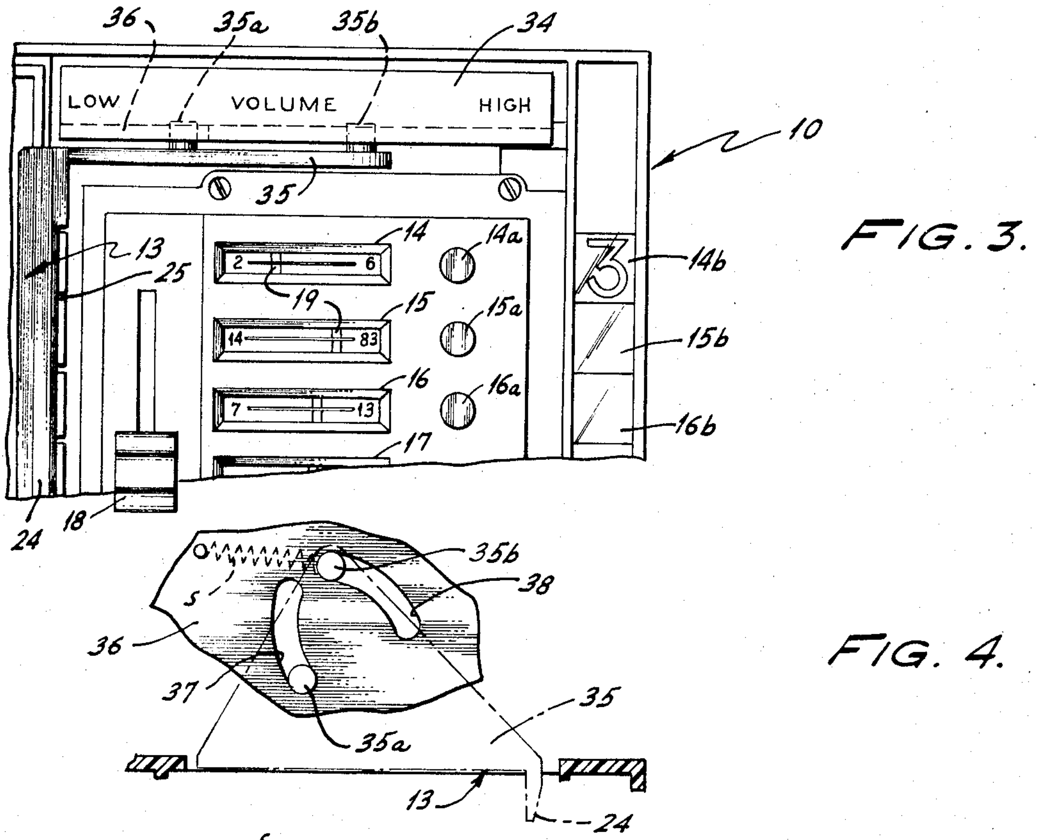
FIG. 3 is a fragmentary elevational view similar to FIG. 1, but showing the door structure in open position to afford access to the controls.
FIGS. 4, 5 and 6 are somewhat diagrammatic views, on a reduced scale, indicating the hinging arrangement which accommodates opening and closing movements of the door with respect to the receiver cabinet.

In the illustrated apparatus the invention is shown as embodied in a television receiver which includes a cabinet 10, a cathode ray tube, fragmentarily shown at 11, and control and speaker instrumentalities which occupy the right hand portion of the cabinet as seen in FIGS. 1 and 3. Specifically, these instrumentalities include a speaker (not shown) which lies behind grille 12, and television receiver instrumentation mounted in a cabinet recess which confronts the right hand upper part of the forward face of the cabinet. This recess is normally closed by a door structure 13. As described below, this door structure is of novel type characteristic of the present invention.

Behind the door structure are the frequency determining devices which are designed to cover the UHF as well as the VHF band. In a typical VVC tuning system the several plunger control elements, and their associated potentiometers, cooperate with a tuner (not shown) to provide for selection and fine tuning of the channels. Four such frequency determining devices appear at 14 to 17, in FIG. 3, in which figure the door 13 has been swung to the left to open position to afford access to the control area. In the illustrated embodiment, which comprises a color receiver, a slidable color control of known type is also provided. Such a control is shown at 18 in FIG. 3. Each of the potentiometer devices includes an elongated housing having an open side confronting the operator. A lead screw (not shown) extends through the housing and a contact carriage, see for example the carriage 19, is driven by the lead screw during fine tuning. In a color receiver, twelve such tuning devices may be used and each is tunable through the agency of an associated reciprocable plunger, to afford preselection of any channel receivable by the set. A plunger **14*a* is associated with the device 14, while plungers 15*a* and 16*a* are associated with devices 15 and 16, respectively. VVC tuning apparatus is known in the art, and apparatus suitable for use as the aforesaid switching and frequency determining device is available, for example, from Prehelektrofeinmechanische Werke, of Bad Neustadt, West Germany, being identified as Model No. P–12/12 and designated PREOMAT. Accordingly, and because the invention is not concerned with such devices, per se, detailed illustration and description are not required herein. However, it should be mentioned that each of the devices (14, etc.) is capable of being set up to condition the tuner to receive any station in the UHF or VHF band, this being accomplished by withdrawing the plunger forwardly of the receiver and rotating the same until a band switching operation is accomplished and an associated tuner is set to receive stations in a desired band. Such band switching is characteristic of the potentiometer and switching device identified above. In FIG. 3, the element 14 is illustrated as it would appear if set to receive Channel 3 in the low end of the VHF band. After return of the plunger 14*a* to its normal position, and further depression thereof inwardly of the receiver, rotation of the plunger results in movement of the carriage 19 and consequent fine tuning of the potentiometer until the desired station is received. After such fine tuning adjustment, depression of the plunger associated with each potentiometer to the position shown by broken line representation of the key in FIG. 2, automatically adjusts the apparatus to the preselected station. Any suitable indicia may be utilized to indicate the channel settings. For example, numerals may be displayed in the areas designated 14*b***, 15*b*, and 16*b* in FIG. 3, it being understood that these areas may be illuminated in any convenient fashion.

Figure 2:
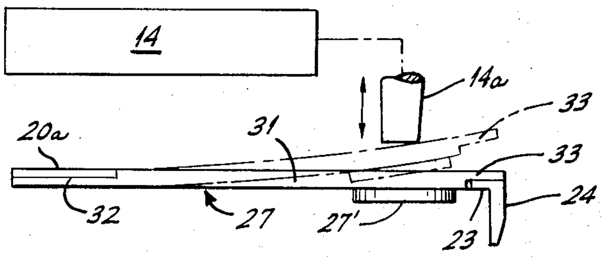
FIG. 2 is a sectional view taken through one of the door-carried key members, and illustrating its construction and the manner in which it may be deflected to engage and operate its underlying plunger.

In particular accordance with our invention, the door structure 13 serves not only as a means for covering the frequency determining devices 14 etc., when they are not in use, but also defines a plurality of key members, in this case twelve, normally lying substantially in the plane of the door and each of which is depressable to a position, out of said plane, in which any depressed key actuates its corresponding plunger (also one of twelve) and adjusts the apparatus to one of the channels which have been preselected. For these general purposes the door structure is mounted for movement, in this case pivotal movement, to the open position (FIG. 3), and to closed position (FIG. 1), in which the key members of the door panel may be used to actuate the plunger associated with the several adjustable devices, as shown in FIG. 2.

To serve these two purposes, the door structure comprises a panel divided into a frame portion and a portion slotted to define the 12 manually operable, tuner-actuating, key members. The frame portion is subdivided into a left hand vertical frame area 20, upper and lower horizontal frame areas 21 and 22, respectively, and a right hand frame area 23 which includes a flange 24 which extends forwardly of the receiver (see particularly FIGS. 2 and 3) and makes it convenient to grasp and manipulate the door.

In the present embodiment the door frame portion extends completely around the panel which comprises the door. However, as will be understood, this frame may extend along less than all edges of the panel, for example along only one or two sides thereof. The term "frame" as used in accompanying claims should be understood as having this broad connotation.

The portion of the panel which does not serve a framing function is horizontally and vertically slotted, as at 25 and 26, respectively, the horizontal slots extending along substantially parallel lines which are generally perpendicular to the side framing portions of the door. In this way the slots divide the major part of the door panel into individual key members, in this case 12, such as the key members designated at 27 and 28 in FIG. 1. The door structure is fabricated of suitable plastic material having considerable resilience, for example a suitable styrene, such as acrylonitrile-budadiene-styrene, commonly known as ABS. The several keys are deflectable out of the general plane of the panel in response to pressure applied against raised finger areas 27' and 28'. (Compare FIGS. 1 and 2.) Such deflection of the keys brings them into contact with the plungers 14 etc. which control the frequency determining devices in the manner illustrated and described above.

The left hand end of each key is fixedly associated with door panel frame portion 20, as shown for example at 29 and 30. While the keys may be integral with the frame, as appears in FIG. 2 we prefer to form the keys separately as elongated strips 31 having at the left end thereof a stepped portion 32 and at the right end thereof a stepped portion 33. The left stepped part 32 overlies and is fixedly secured to a suitably depressed strip **20*a* of the left panel frame portion 20. Sonic or adhesive "welding" is suitable for this purpose. The right stepped portion 33 serves as a stop for the resilient key when it returns toward its normal position, in which the stepped portion 33 bears against right hand frame area 23, as shown in FIG. 2**.

As will be appreciated from comparison of FIGS. 1 and 2, this construction gives the door panel a flat, even, look and results in firm association of the plurality of keys with the door panel frame. As indicated above, and shown in FIG. 2, depressing any selected key engages the control plunger of the tuning element which lies directly behind that key. When sufficient pressure is applied to the key the plunger is depressed and latched mechanically through the agency of a latch bar of a type common in tuners, for example auto radio tuners. Upon release, the key returns to its original position in the general plane of the door panel, while the actuated plunger stays engaged maintaining the receiver tuned to the selected channel. Depressing another key engages the latch bar causing the first plunger to be disengaged and latching the plunger then actuated. Such latching apparatus is well known in the tuner art and illustration and detailed description thereof are not required for understanding of this invention.

Directly above the door structure 13 is a rectangular element 34 which comprises a bar constructed to serve another control function, and having its center portion pivotally mounted in any convenient fashion. This bar may, for example, be used to control volume. Increase or decrease in volume is effected by depressing briefly, or repeatedly, the left or right surface portions of the bar 34. This type of bar-actuated volume control forms the subject matter of our copending disclosure bearing Ser. No. 138,548, filed Apr. 29, 1971, and assigned to the assignee of the present invention.

Figures 5, 6:
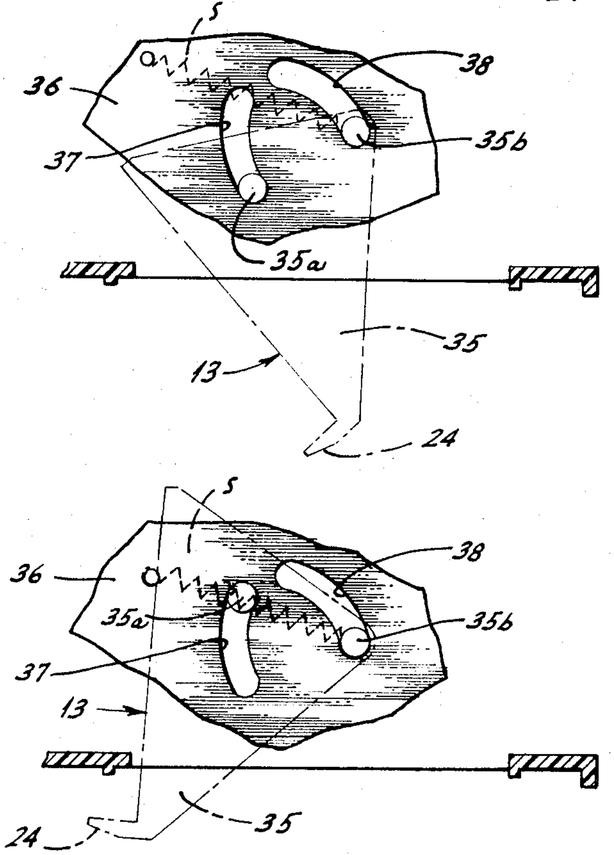

The door is provided with hinging apparatus illustrated, somewhat diagrammatically, in FIGS. 4, 5 and 6. This hinging apparatus accommodates opening and closing movement of the door with respect to the receiver cabinet 10, and resilient means (the spring S) is provided which holds the door in either its open or its closed position. To provide door hinging, with complete retraction of the door within the cabinet and minimal lateral extension of the door during closing, we utilize opposed pairs of double pivot, lost-motion, connections. One pair is disposed adjacent the upper edge of the door, and the opposite pair is disposed adjacent the lower edge of the door. As shown in FIGS. 3 to 6 the upper horizontal frame portion 21 of the panel terminates in a generally triangular rearward extension or "porch" 35 which carries a pair of pivot pins **35*a* and 35*b*. The lower horizontal frame portion 22 would be provided with a similar extension and with corresponding pivot pins. The pins 35*a* and 35*b* extend through an upper horizontal cabinet framing member 36, which is provided with a pair of arcuate slots to accommodate the pins. These slots are shown at 37 and 38 in each of FIGS. 4 through 6. When the door is in closed position, as shown in FIG. 4, the pivot pins 35*a* and 35*b* are, respectively, disposed at the forward and rear ends of the slots 37 and 38. As the door is moved toward open position (FIG. 5) pivot 35*a* remains in its forward position in slot 37, while pivot 35*b* translates to the forward end of slot 38. As the swinging movement of the door is continued toward the fully opened and retracted position shown in FIG. 6, pivotation continues about the pivot 35***b* which remains engaged with the forward end wall of arcuate slot 38 while pivot 35*a* translates toward the rear end of its arcuate slot 37. Movement of the door is limited — to the position shown in FIG. 6 — when pivot pin 35*a* abuts the rear wall surface of slot 37. The spring S reacts between the pivot 35*b* and a fixed point in frame 36. In this position its force is exerted along a line just forward of pivot pin 35*a*, to hold the door in open position. From comparison of these figures it will be appreciated that the door is pivoted well into the cabinet, affording easy access to the tuning instrumentalities for adjustment purposes, and pivotal movement of the door takes place with minimum projection laterally of the cabinet opening.

We claim:

1. In combination with a television receiver housed in a cabinet and having control means including presettable tuning means and a plurality of operating members each of which may be moved to provide for switching to a corresponding frequency channel, means providing for preselection of the desired frequency channels and for selective actuation of said members to receive any preset channel, said presetting and actuating means including: door structure mounted upon said cabinet to life in the general plane of a wall thereof and to form a portion of such wall, said door structure being movable to an open position affording access to said control means for presetting purposes, said door structure being divided into a frame portion and a portion lying in the general plane of said frame portion and slotted to define a plurality of manually operable, generally parallel keys one end of each of which is formed integrally with said frame portion and the part extending from said one end is deflectable for movement to a position in which it is depressed with respect to the general plane of said door structure; the construction and disposition of said keys, with respect to said members, being such that deflection of any key to the last mentioned position moves a corresponding one of said members and switches said tuning means to a corresponding one of said channels preselected.

2. A combination in accordance with claim 1, and further characterized in that the door structure, including both said frame portion and said keys which form a portion of said door structure, are fabricated of styrene plastic material having sufficient inherent resilience to accommodate depressing of said key members and to provide for return of the same to the general plane of the door structure.

* * * * *